Dec. 18, 1962  J. RODWAY  3,068,652
HYDRAULIC BRAKE MECHANISMS
Filed Sept. 18, 1961  2 Sheets-Sheet 1
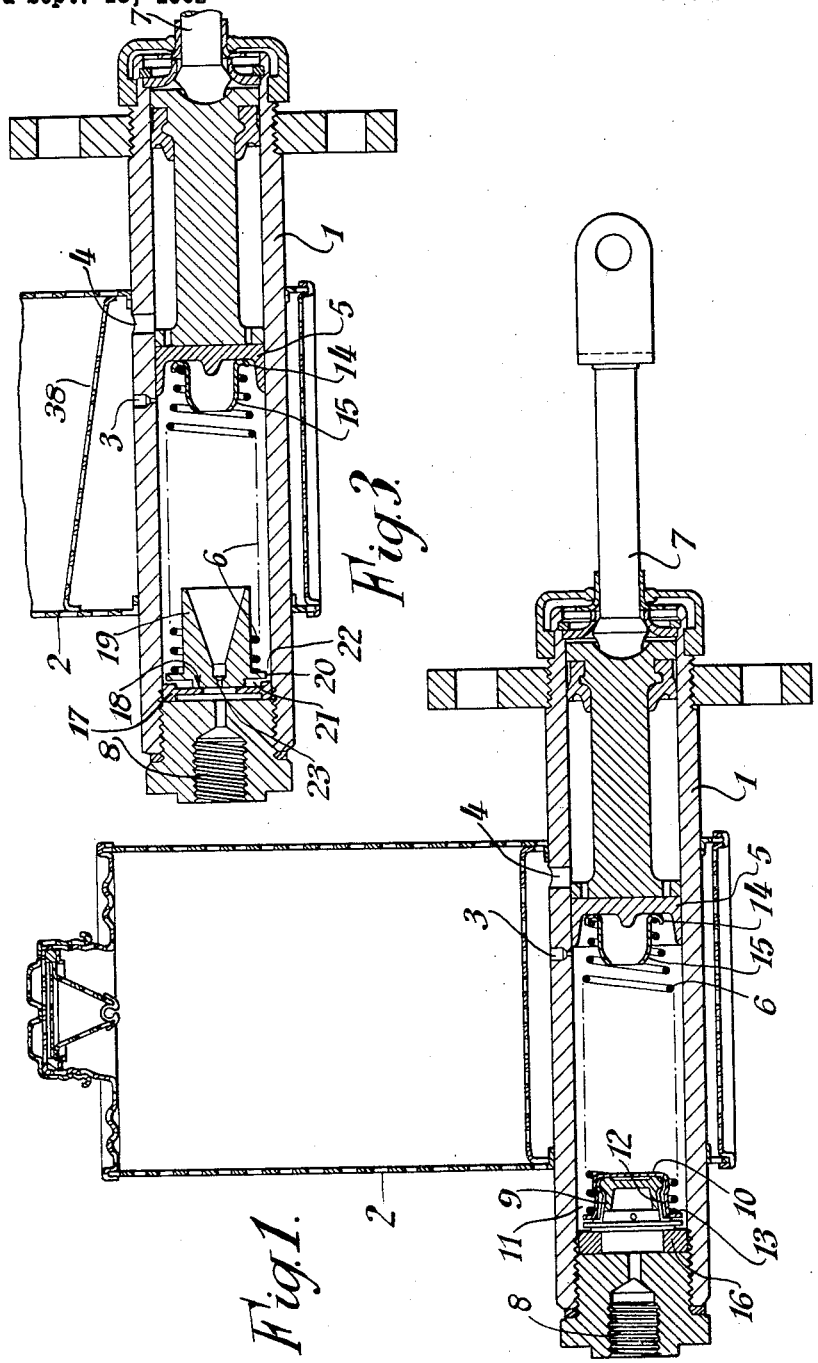
INVENTOR
JOHN RODWAY
BY Lawrence J. Winter
ATTORNEY Dec. 18, 1962 J. RODWAY 3,068,652
HYDRAULIC BRAKE MECHANISMS
Filed Sept. 18, 1961 2 Sheets-Sheet 2
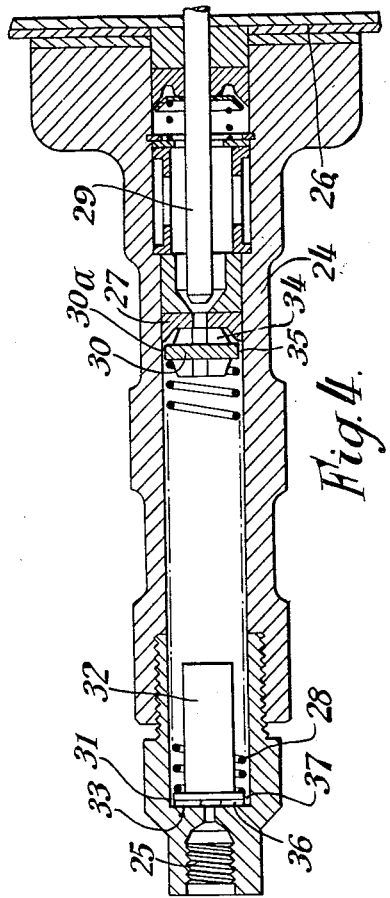
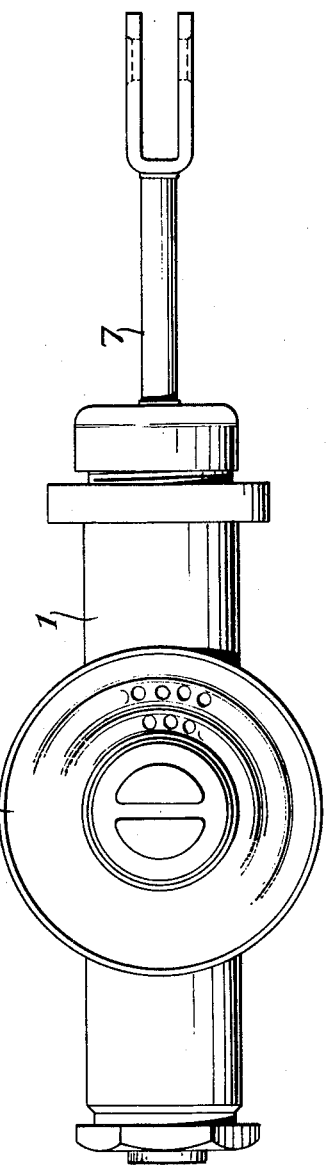
INVENTOR
JOHN RODWAY
BY Lawrence J. Winter
ATTORNEY United States Patent Office 3,068,652
Patented Dec. 18, 1962

3,068,652
HYDRAULIC BRAKE MECHANISMS
John Rodway, Leamington Spa, England, assignor to Automotive Products Company Limited, Leamington Spa, England
Filed Sept. 18, 1961, Ser. No. 138,778
Claims priority, application Great Britain Sept. 21, 1960
11 Claims. (Cl. 60—54.6)

This invention relates to hydraulic brake mechanisms and has for its object to provide improvements which assist efficient bleeding of the hydraulic system.

The efficient bleeding of a hydraulic braking system is of the utmost importance particularly with the advent of disc brakes since the high pressure used and the high overall leverages required for such brakes give rise to considerable loss of pedal travel if any air is trapped in the system.

As a result of considerable investigation on hydraulic brake mechanisms it has been found that during operation of the master cylinder piston, air is trapped in the piston return spring as the same is compressed, the trapped air tending to collect mainly in the region around the outlet at the end of the master cylinder so that the hydraulic fluid passes out through the outlet into the system leaving the region occupied by the air unswept by the hydraulic fluid. We have found however that the accumulation of trapped air as above referred to can be overcome by ensuring that the hydraulic fluid sweeps the region around the master cylinder outlet before passing into the outlet, and to this end according to the present invention, it is proposed to provide in the cylinder of a master cylinder for hydraulic brake mechanisms, means for causing the hydraulic fluid as it is displaced by the piston movement, to sweep the region at the outlet end of the cylinder before passing into the said outlet.

Whilst the form of the means provided in the cylinder may vary we have found that a highly satisfactory result can be obtained by the use of a substantially cylindrical member which is located concentrically in the master cylinder the periphery of the said member forming with the surrounding wall of the cylinder an annular space extending axially from the outlet end of the cylinder and through which the displaced hydraulic fluid sweeps before passing through the outlet.

Embodiments of the invention will now be described by way of example by aid of the accompanying drawings in which:

FIGURE 1 shows in cross section a barrel type master cylinder unit incorporating the means according to one embodiment of the invention;

FIGURE 2 is a plan view of FIGURE 1;

FIGURE 3 also shows in cross section a barrel type master cylinder unit part of the tank being removed, incorporating the means according to a further embodiment of the invention.

FIGURE 4 shows in cross section a servo-actuated barrel type master cylinder incorporating the means according to a still further embodiment of the invention.

Referring to the accompanying drawings, FIGURES 1 and 2 show a barrel type master cylinder unit of generally known construction which consists of a master cylinder 1 and a tank 2 for hydraulic liquid the master cylinder extending diametrically through the tank adjacent the lower end thereof. The tank interior is in communication with the interior of the barrel of the master cylinder through holes 3 and 4 in the wall of the barrel the tank and barrel being secured together by brazing which also provides a liquid tight joint therebetween. The master cylinder piston 5 is held in the retracted position by a compression spring 6, the piston 5 being displaceable against the action of the spring by movement of a rod 7 adapted for connection through a linkage not shown to a foot pedal or other operator actuated means to displace hydraulic liquid in the master cylinder barrel through an outlet 8 in one end of the master cylinder barrel the outlet being normally closed by a cup-type outlet valve 9.

In applying the invention to the master cylinder having a cup-type outlet valve as above described a highly satisfactory bleed performance is obtained by providing a cover around the cup-type outlet valve which forms an annular space with the surrounding wall of the cylinder and an annular space between the valve and cover whereby the fluid is caused to sweep round the valve in the outer annular space and in the annular space between the valve and cover before passing through the valve into the master cylinder outlet.

Thus according to the arrangement shown in FIGURE 1 the cup-type outlet valve 9 is arranged in the usual manner at the outlet end of the master cylinder and is surrounded by a metal cap 10 of larger internal diameter than the external diameter of the valve to provide an annular space 11 between the cap and valve an annular space 12 being also formed between the cap periphery and the surrounding wall of the cylinder. The metal cap 10 is arranged with its open end facing the outlet end of the master cylinder the closed ends of the cap and valve being pressed into contact with one another by the compression spring 6 located in the master cylinder one end of which is arranged to bear on an external rim 13 around the open end of the cap the opposite end of the spring bearing against the rim 14 of the spring retaining cup 15 supported by the master cylinder piston 5.

With this arrangement, as the open end of the annular space 11 between the valve and cap faces the interior wall formed by the inner face of the spacing washer 16 at the outlet end of the master cylinder and in close proximity thereto hydraulic liquid is deflected radially inwards through the restricted space between the open end of the cap and the spacing washer 16 and accordingly can only pass into the annular space from this end of the master cylinder thus the maximum volume of the liquid space within the cylinder is swept by the displaced liquid ensuring that air does not become trapped in the region around the outlet.

FIGURE 3 shows a barrel type master cylinder unit of identical construction to that shown in FIGURES 1 and 2 and accordingly the same reference numerals have been used to identify corresponding parts.

In this embodiment of the invention the outlet 8 is normally closed by an annular diaphragm type valve 17 which co-operates with a seating provided by one end 18 of a cylindrical member formed by a bush 19 disposed within the interior of the master cylinder barrel, the bush 19 being urged towards the valve 17 by the compression spring 6 one end of which bears against the rim 14 of the spring retaining cup 15, the opposite end bearing against a peripheral shoulder 20 on the bush 19 said shoulder being axially offset from the end 18 of the bush to provide a space 21 between the opposite faces of the shoulder and diaphragm valve.

A small clearance 22 is provided between the periphery of the shoulder 20 and the surrounding wall of the master cylinder barrel so that as the piston 5 is moved towards the outlet end of the master cylinder the displaced hydraulic fluid sweeps through this clearance into the restricted space 21 past the diaphragm valve and through the outlet 8. The axial length of the portion of the bush behind the peripheral shoulder 20 is such that that this portion together with the spring retaining cup 15 substantially fill the internal space of the compression spring 6 when compressed thereby minimising the possibility of air being trapped within the spring. The bore of the bush 19 is formed to provide an opening 23 of considerably reduced cross-sectional area in the end 18.

FIGURE 4 shows a further embodiment of the invention applied to a servo-actuated barrel type master cylinder unit. The unit shown is of generally known construction and consists of a barrel cylinder 24 having an outlet 25 at one end, the other end being formed with a flange for securing the unit to an end wall part of which is shown at 26, of a servo-device. The master cylinder piston 27 is held in the retracted position by a compression spring 28, the piston being movable against the action of the spring to displace hydraulic liquid in the barrel cylinder upon actuation of a rod 29 by the servo device.

In the construction shown, the compression spring 28 extends between a peripheral shoulder 30a on a bush 30 and the inner face of a flange 31 at one end of a cylindrical member 32, the spring thus acting to urge the bush 30 against the piston of the master cylinder and the outer face 33 of the cylindrical member flange into contact with the inner surface of the end wall of the master cylinder. Radial slots 34 are provided in the face of the bush in contact with the piston and a small clearance 35 is provided between the periphery of the shoulder 30a thereof and the surrounding wall of the cylinder barrel, radial slots 36 also being provided in the outer face of the flange 31, a clearance 37 also being provided between the periphery of the flange and the surrounding wall of the master cylinder barrel.

In operation, hydraulic fluid passing through the central opening in the piston 27 upon initial movement of the rod 29 is deflected radially outwards through the radial slots 34 and through the clearance 35 into the portion of the cylinder barrel containing the spring. Continued movement of the rod 29 results in displacement of the piston 27 the hydraulic liquid displaced being caused to pass through the clearance 37, radially inwards through the restricted space provided by the radial slots 36 and thus to the outlet 25. The hydraulic liquid is therefore caused to sweep through the region around the master cylinder outlet before passing into the outlet thus avoiding the accumulation of trapped air in the master cylinder. The axial length of the cylindrical member is such that this member together with the forward portion of the bush 30 substantially fill the internal space within the compression spring when compressed thereby minimising the possibility of air being trapped within the spring.

Whilst the invention disclosed above is primarily concerned with the master cylinder it was also discovered during our investigations that air bubbles formed beneath the baffle provided in the liquid storage tank mounted on the master cylinder barrel such air passing into the master cylinder through the breather hole. This can be overcome as shown in FIGURE 3 of the accompanying drawings, by arranging the baffle 38 so that it lies in a plane at an angle to the horizontal the baffle also for preference having a plain surface. An angle of tilt of 10° or more has been found suitable.

I claim:

1. A master cylinder having a concentrically disposed outlet in one end wall thereof, an elongate cylindrical member in said cylinder adjacent said one end wall and contiguous to said outlet, said cylindrical member having its axial periphery forming an uninterrupted axially extending annular space with the inner surface of said cylinder, a radially outwardly extending rim portion on the end of said cylindrical member nearest said outlet, the outer periphery of said rim portion forming a second uninterrupted axially extending annular space with the inner surface of said cylinder and in communication with said first mentioned annular space and means forming a transversely extending restricted space between said rim portion and said outlet, and biasing means abutting said rim portion and mounted around the periphery of said cylindrical member, wherein hydraulic liquid is swept around the outer periphery of said cylindrical member and said rim portion and thereafter swept radially inwardly toward said outlet.

2. A master cylinder according to claim 1 wherein a cover is provided around a cup-type outlet valve in the master cylinder, the periphery of the cover forming said annular space with the surrounding wall of the cylinder and an annular space between the valve and cover whereby the hydraulic fluid is caused to sweep round the valve in the outer annular space and in the annular space between the valve and cover before passing through the valve into the master cylinder.

3. A master cylinder according to claim 2 wherein the cup-type valve is surrounded by a cap of larger internal diameter than the external diameter of the valve the cap being arranged with its open end facing the outlet end of the master cylinder the closed ends of the cap and valve being urged into contact with one another, the open end of the cap being formed to provide with a surface forming the outlet end of the cylinder said restricted space through which the hydraulic liquid passes from said annular spaces to said restricted space.

4. A master cylinder according to claim 1 wherein the end of the cylindrical member facing the outlet end of the master cylinder provides a seating for an annular diaphragm type valve located in the master cylinder the cylindrical member being formed to provide with the diaphragm type valve said restricted space through which the hydraulic liquid passes in its passage from said annular spaces to the outlet.

5. A master cylinder according to claim 1 wherein the end of the cylindrical member is formed to provide with the end wall of the master cylinder at the outlet end thereof said restricted space through which the hydraulic liquid passes in its passage from the annular space to the outlet.

6. A master cylinder according to claim 3 wherein said biasing means is a compression spring and extends between the master cylinder piston and the cap the spring action urging the piston to the retracted position and urging the cap towards the outlet end of the master cylinder.

7. A master cylinder according to claim 4 wherein said biasing means is a compression spring and extends between the master cylinder piston and the cylindrical member the spring action urging the piston to the retracted position and the cylindrical member towards the outlet end of the cylinder.

8. A master cylinder according to claim 6 wherein the axial length of the cap is such that the cap together with a spring retaining cup at the piston end of the spring substantially fill the internal space within the compression spring when compressed.

9. A master cylinder according to claim 7 wherein the axial length of the cylindrical member together with a spring retaining cup or other spring retaining member at the piston end of the spring substantially fill the internal space within the compression spring when compressed.

10. A master cylinder unit comprising in combination a master cylinder according to claim 8 and a tank for hydraulic liquid mounted on the master cylinder.

11. A master cylinder unit according to claim 10 wherein the tank interior has a baffle adjacent the lower end thereof arranged at an angle to the base thereof.

References Cited in the file of this patent

UNITED STATES PATENTS

| | | |
|---|---|---|
| 2,140,751 | La Brie et al. | Dec. 20, 1938 |
| 2,205,806 | Belenkij | June 25, 1940 |
| 2,255,259 | Loweke | Sept. 9, 1941 |
| 2,305,764 | Farina | Dec. 22, 1942 |
| 2,314,150 | Loweke | Mar. 16, 1943 |